US008942627B2

(12) United States Patent
Jain et al.

(10) Patent No.: US 8,942,627 B2
(45) Date of Patent: Jan. 27, 2015

(54) IDENTIFIERS FOR MTC GROUP IN 3GPP SYSTEMS

(75) Inventors: Puneet Jain, Hillsboro, OR (US); Muthaiah Venkatachalam, Beaverton, OR (US); Meghashree Dattatri Kedalagudde, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 13/588,090

(22) Filed: Aug. 17, 2012

(65) Prior Publication Data

US 2013/0196704 A1 Aug. 1, 2013

Related U.S. Application Data (60) Provisional application No. 61/591,641, filed on Jan. 27, 2012.

(51) Int. Cl.
*H04W 4/06* (2009.01)

(52) U.S. Cl.
USPC .................. 455/41.1; 455/422.1; 455/450

(58) Field of Classification Search
CPC .... H04B 7/024; H04B 7/0413; H04B 7/0456; H04B 7/0617; H04B 7/0639; H04L 5/0035; H04L 5/0053; H04W 72/085
USPC ............ 455/41.1, 41.2, 418, 419, 422.1, 434, 455/450, 452.1, 67.11
See application file for complete search history.

(56) References Cited

U.S. PATENT DOCUMENTS

| 2011/0128911 A1 | 6/2011 | Shaheen |
| 2011/0201344 A1 | 8/2011 | Ryu et al. |

FOREIGN PATENT DOCUMENTS

| KR | 10-2011-0082486 A | 7/2011 |
| KR | 10-2011-0093582 A | 8/2011 |
| WO | 2011/087826 A1 | 7/2011 |
| WO | 2013112928 A1 | 8/2013 |

OTHER PUBLICATIONS

International Search Report and Written Opinion received for PCT Patent Application No. PCT/US2013/023286 mailed on May 16, 2013, 11 pages.
International Preliminary Report on Patentability and Written Opinion received for PCT Patent Application No. PCT/US2013/023286, mailed on Aug. 7, 2014, 8 pages.

*Primary Examiner* — Thanh Le
(74) *Attorney, Agent, or Firm* — Cool Patent, P.C.

(57) ABSTRACT

Machine-Type-Communication-type (MTC-type) devices of an MTC Group are uniquely identified across all types of wireless networks by a system and method in which a receiver is capable of receiving a signal from at least one node of a wireless network. The signal contains MTC Group ID information that corresponds to an MTC Feature that provides at least one system optimization for the wireless device. The received MTC Group ID is then processed to determine whether the MTC received Group ID corresponds to an MTC Feature to which a wireless device is a member. The MTC Group ID information contained in the received signal comprises part of a Mobile Subscription Identification (MSIN) field of an International Mobile Subscriber Identify (IMSI), additional digits added to an IMSI, of part of a separate MTC Group message.

28 Claims, 9 Drawing Sheets

IDENTIFIERS FOR MTC GROUP IN 3GPP SYSTEMS

CROSS-REFERENCE TO RELATED APPLICATIONS

The present patent application is related to and claims priority from U.S. Provisional Patent Application Ser. No. 61/591,641, filed Jan. 27, 2012, which is hereby incorporated by reference herein in its entirety.

TECHNICAL FIELD

Embodiments described herein are generally directed to the field of wireless communications.

BACKGROUND ART

Machine-type communication (MTC) is a form of data communication that involves communication between one or more entities that do not necessarily need human interaction. A service optimized for MTC differs from a service optimized for Human-to-Human communications. For example, MTC is different from current mobile network communication services as it involves different market scenarios, data communications, lower costs and effort, a potentially very large number of communicating terminals with, and to a large extent, little traffic per terminal.

MTC applications do not all have the same characteristics. Consequently, not every system optimization is suitable for every MTC application. The $3^{rd}$ Generation Partnership Project (3GPP) Technical Specification Group Services and System Aspects; Service Requirements for Machine-Type Communications 3GPP TS 22.368 defines MTC Features that provide structure for the different system optimization possibilities that can be invoked under 3GPP TS 22.368. For example, MTC Features provided to a particular subscriber are identified in the subscription, and MTC Features can be individually activated.

Specific service requirements for various MTC Features are defined under the 3GPP TS 22.368 Technical Specification, such as Low Mobility, Time Controlled, Time Tolerant, Small Data Transmissions, Mobile Originated Only, Infrequent Mobile Terminated, MTC Monitoring, Priority Alarm, Secure Connection, Location-Specific Trigger, and Infrequent Transmission. Group-based MTC Features that have been defined include Group-based Policing, and Group-based Addressing.

A Group-based MTC Feature is an MTC Feature that applies to a particular MTC group, such that each Group-based MTC Feature is applicable to all the members of the MTC Group. Accordingly, a Group-based MTC feature requires a Group ID defined in order to address a particular MTC group. MTC Feature Group Based Addressing is intended for use with a MTC Group for which a network operator would like to optimize a message volume when many MTC-type devices need to receive the same message.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been to repeated among the figures to indicate corresponding and/or analogous elements.

DESCRIPTION OF THE EMBODIMENTS

Embodiments of described herein relate to a technique for identifying MTC-type is groups in a wireless system, such as, but not limited to, a 3GPP-type communication network. In the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment.

Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

The subject matter disclosed herein provides a technique for associating an MTC device with a single MTC group, and so that an MTC group is uniquely identified across all 3GPP-type networks. Additionally, the subject matter disclosed herein provides a technique for identifying MTC-type groups in a wireless system, such as, but not limited to, a 3GPP-type communication network.

Figure 1:
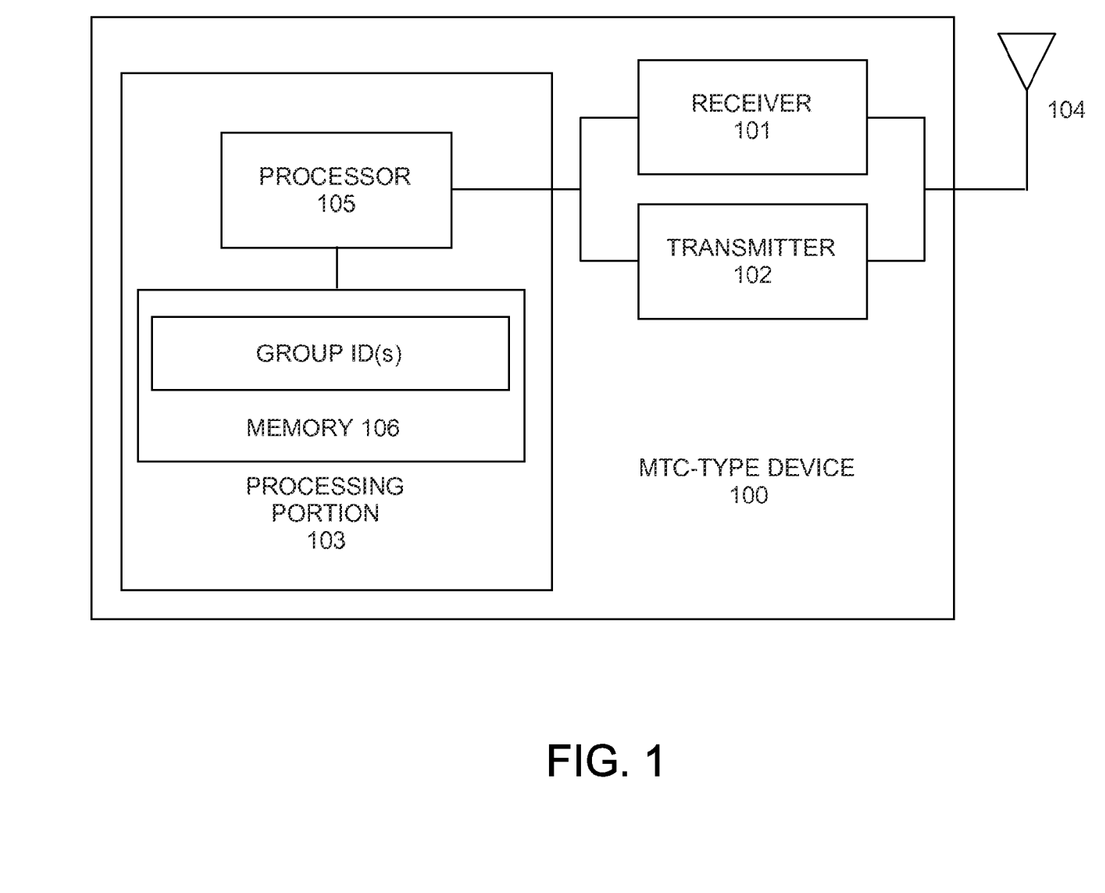
FIG. 1 depicts an exemplary functional block diagram of an MTC-type device according to the subject matter disclosed herein.

FIG. 1 depicts an exemplary functional block diagram of an MTC-type device 100 according to the subject matter disclosed herein. MTC-type device 100 comprises a wireless device that includes a receiver portion 101, a transmitter portion 102, and a processing portion 103. Receiver portion 101 and transmitter portion 102 are coupled in a well-known manner to processing portion 103 and to one or more antennas 104. Processing portion 103 includes a processor device 105 and a memory 106. Memory 106 is capable of storing information and instructions for, but not limited to, controlling operation of processor device 105. Processing portion 103 can be configured as described in connection with any of a machine-to-machine (MTM) device 402 (FIG. 4), a UE 511 (see FIG. 5), and/or an information-handling system 800 (see FIGS. 8 and 9) disclosed herein. Memory 106 can be embodied as any of the types of memory devices disclosed herein, and is also capable of storing information relating to one or more Group IDs for MTC-type device 100.

Processor device 105 is capable of processing MTC Group ID information contained in a received signal and determining if the received MTC Group ID information corresponds to the information stored in memory 106 relating to the one or more Group IDs for MTC-type device 100. If, for example, the received MTC Group ID information corresponds to the information stored in memory 106 and the received signal also contains information or instructions for MTC-type devices of the MTC Group ID turn on a function associated with the MTC Feature of the MTC Group, MTC-type device 100 responds by turning on the function associated with the MTC Feature; otherwise the received signal is ignored.

It should be understood that MTC-type device 100 could be embodied comprising more or fewer functional blocks than depicted in FIG. 1. Additionally, although in one exemplary embodiment, MTC-type device 100 wirelessly connects to a 3GPP-type communication network, it should be understood that the subject matter disclosed herein is not so limited, and MTC-type device 100 could wirelessly connected to other types of wireless networks, such as, but not limited to, that are based on a Bluetooth-based standard, an IEEE 802.11-based standard, an IEEE 802.16-based standard, an IEEE 802.18-based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, or a ZigBee-based network, or a combination thereof.

Figure 2:
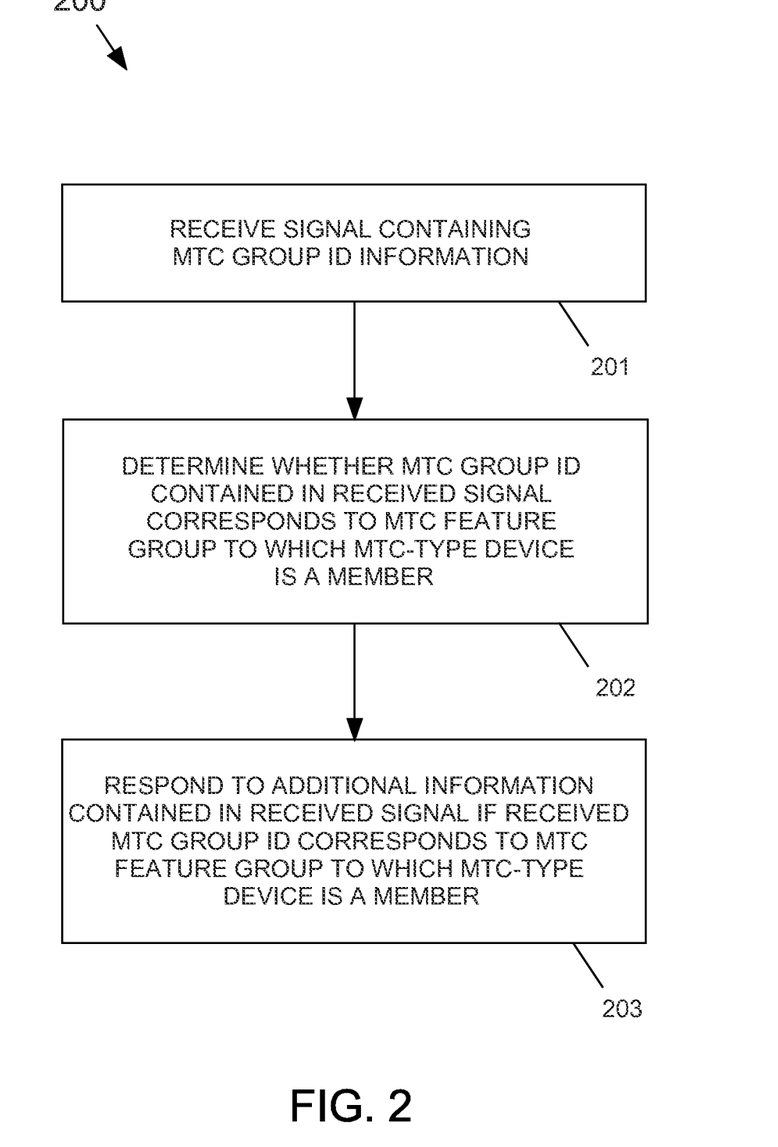
FIG. 2 depicts one exemplary embodiment of a flow diagram for a technique for identifying MTC-type groups in a wireless system, such as, but not limited to, a 3GPP-type communication network, according to the subject matter disclosed herein.

FIG. 2 depicts one exemplary embodiment of a flow diagram 200 for a technique for identifying MTC-type groups in a wireless system, such as, but not limited to, a 3GPP-type communication network, according to the subject matter disclosed herein. At 201, a signal is received at an MTC-type device, such as MTC-type device 100, from at least one node of a wireless network. The received signal contains a machine-type communication (MTC) comprising MTC Group ID information, such that the MTC Group ID information corresponds to an MTC Feature that provides at least one system optimization for the MTC-type device. Exemplary MTC Features include, but are not limited to, Low Mobility, Time Controlled, Time Tolerant, Small Data Transmissions, Mobile Originated Only, Infrequent Mobile Terminated, MTC Monitoring, Priority Alarm, Secure Connection, Location-Specific Trigger, and Infrequent Transmission. Group-based MTC Features that have been defined include Group-based Policing, and Group-based Addressing. At 202, it is determined whether the MTC Group ID contained in the received signal corresponds to an MTC Feature to which the MTC-type device is a member. At 203, if the MTC Group ID contained in the received signal corresponds to an MTC Features to which the MTC-type device is a member, the MTC-type device responds to additional information that may be contained in the received signal relating to the MTC Feature to which the wireless device is a member. Otherwise, the received signal is ignored. In one exemplary embodiment, the additional information that may be contained in the received signal could be, but is not limited to, a trigger command to initiate communication with an MTC server.

Figure 3A:
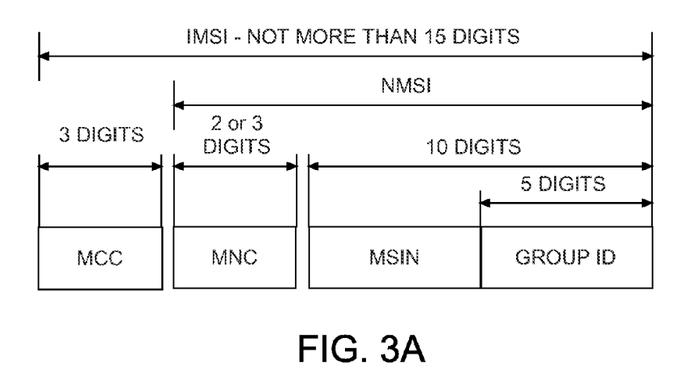
FIGS. 3A-3C depict exemplary embodiments of an MTC Group ID for identifying MTC-type groups in a wireless system according to the subject matter disclosed herein.

FIG. 3A depicts a first exemplary embodiment of an MTC Group ID that is included as part of a Mobile Subscription Identification (MSIN) field of an International Mobile Subscriber Identify (IMSI) according to the subject matter disclosed herein. In particular, FIG. 3A depicts an MTC Group ID (Group ID) as comprising five digits in the MSIN field of the IMSI. An IMSI is composed of three parts: a Mobile Country Code (MCC), a Mobile Network Code (MNC) and a Mobile Subscriber Identification Number (MSIN). The MCC comprises three digits and uniquely identifies the country of domicile of a mobile subscriber for an MTC-type device. The MNC comprises two or three digits for GSM/UMTS applications, and identifies the Home Public Land Mobile Network (PLMN) of the mobile subscriber for the MTC-type device. The length of the MNC is either two or three digits depending on the value of the MCC. The MSIN comprises ten digits and identifies the mobile subscriber within the PLMN (5 digits) and MTC Group ID (5 digits). By including the MTC group ID at part of the MSN field, there would be a minimal impact on the communication model defined under the 3GPP TS 22.368 Technical Specification because an IMSI is used for group addressing with Group ID embedded with the IMSI.

Figure 3B:
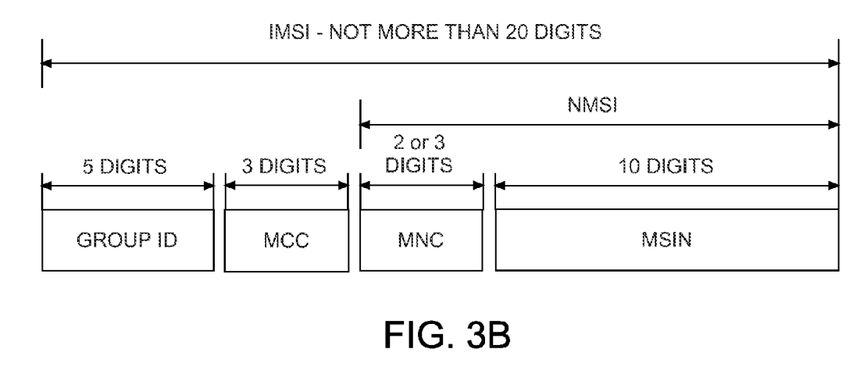

FIG. 3B depicts a second exemplary embodiment of an MTC Group ID that is included as additional digits to an International Mobile Subscriber Identify (IMSI) according to the subject matter disclosed herein. In the second exemplary embodiment, the additional digits for the Group ID (specifically five digits) results in an IMSI that is greater than 15 digits and in this specific embodiment, a total of 20 digits. The second exemplary embodiment also provides a minimal impact on the communication model defined under the 3GPP TS 22.368 Technical Specification because an IMSI is used for group addressing with Group ID embedded with the IMSI, although a greater number of digits are needed in comparison to the first exemplary embodiment.

Figure 3C:
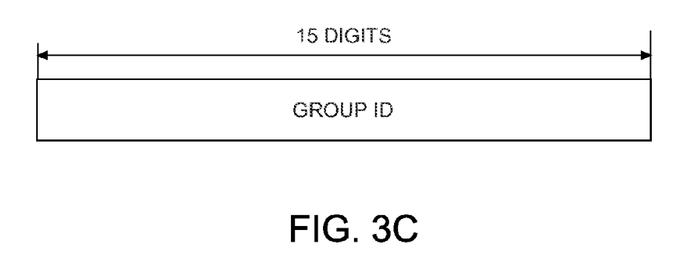

FIG. 3C depicts a third exemplary embodiment of an MTC Group ID that is capable of being part of a separate MTC Group message according to the subject matter disclosed herein. The third exemplary embodiment that comprises a format arrangement that is different than the format arrangement of an International Mobile Subscriber Identify (IMSI). In particular, the third exemplary embodiment provides a Group ID comprising 15 digits that would be communicated to MTC-type devices separately from the IMSI. In one exemplary embodiment, the third exemplary embodiment of an MTC group ID according to the subject matter disclosed herein could be arranged to be based on, for example, a Network Access Identifier (NAI) format, a Session Initiation Protocol Uniform Resource Identifier (SIP URI) format, or a Fully Qualified Domain Name (FQDN) format. For example, if the MTC group ID is based on an NAI format, the 15-digit MTC Group ID format could be embedded as part of a username (i.e., <username>@<realm>, in which <realm> identifies a mobile service provider domain). Similarly, if the MTC Group ID is based on a URI or an FQDN format, the 15-digit MTC Group ID can be part of the URI or FQDN format.

Figure 4:
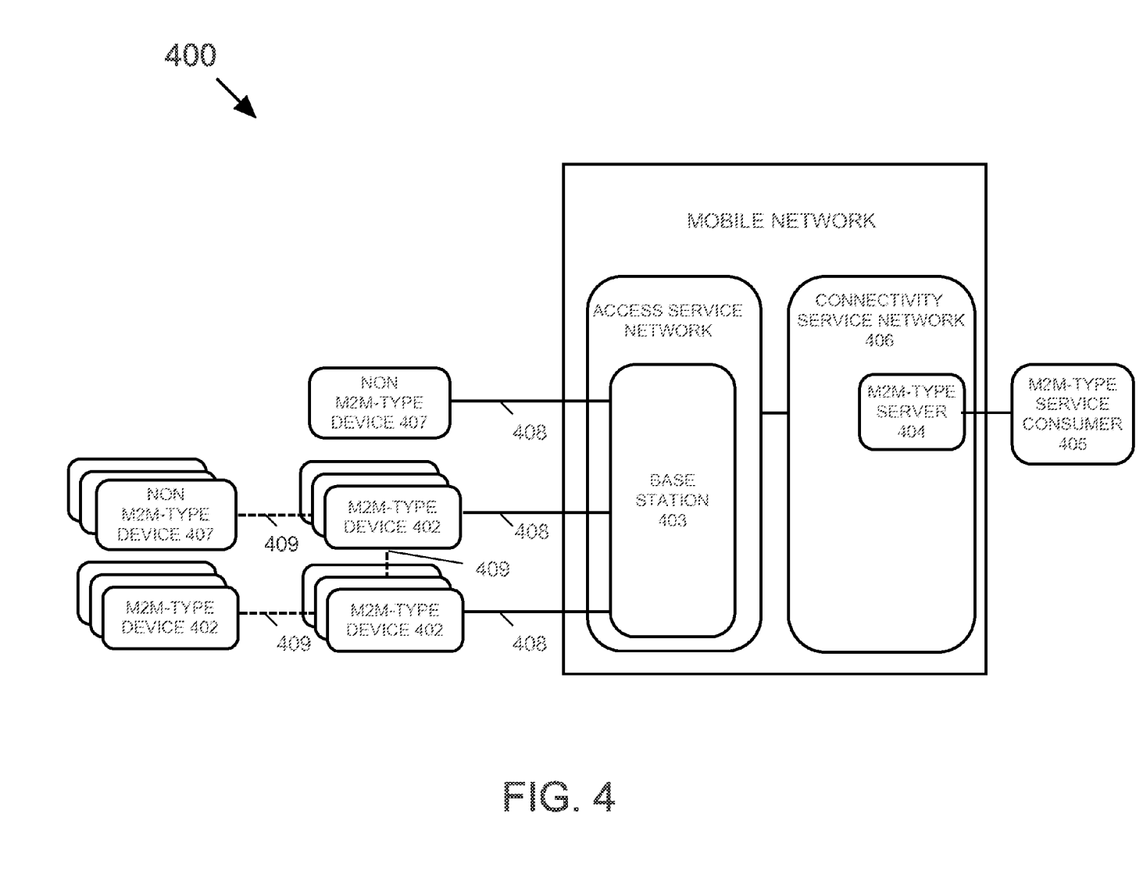
FIG. 4 depicts an exemplary high-level system configuration for an IEEE-802.16-based M2M-type communications network 400 that is in accordance with one or more exemplary embodiments disclosed herein.

FIG. 4 depicts an exemplary high-level system configuration for an IEEE-802.16-based M2M-type communications network 400 that is in accordance with one or more exemplary embodiments disclosed herein. In particular, one or more of the elements of wireless network 400 may be capable of utilizing an MTC Group ID according to the subject matter disclosed herein. It should be understood, however, the specific type of wireless communication network is not limited to an IEEE-802.16-type wireless communication network. As shown in FIG. 4, a plurality of M2M-type devices 402 are wirelessly connected through a base station BS 403 to an M2M-type server 404. In one exemplary embodiment, base station 403 comprises an IEEE-802.16-type base station. In other exemplary embodiments, base station 403 comprises, but is not limited to, an IEEE-802.11-type base station. Each M2M-type device 402 provides IEEE-802.16-type M2M functionality. M2M-type server 404 is an entity that communicates with the one or more IEEE-802.16-type M2M devices 402. M2M-type server 403 also has an interface that can be accessed by an M2M-type service consumer 405. An M2M-type service consumer 405 is a user of M2M-type services, such as a power utility company. M2M-type server 404 may reside within or outside of a Connectivity Service Network (CSN) 106 of a mobile network 401 and provides specific M2M-type services for one or more IEEE-802.16-type M2M devices 402. An M2M-type application runs on the IEEE-802.16-type M2M devices 402 and the M2M-type server 404.

The exemplary architecture of an IEEE-802.16-based M2M-type communications system, such as that depicted in FIG. 4, supports two types of M2M-type communication. The first type of M2M-type communication is between one or more IEEE-802.16-type M2M-type devices 402 and an IEEE-802.16-type M2M-type server 404, and is indicated at 408 in FIG. 4. The second type of M2M-type communication, indicated at 409 in FIG. 4, is a point-to-multipoint communication between an IEEE-802.16-type M2M-type device 402 and base station BS 403. Either type of M2M-type communication can include MTC Group ID information that corresponds to an MTC Feature providing at least one system optimization for the MTC-type device. The MTC Group ID can be configured as any of the exemplary embodiments disclosed herein for an MTC Group ID.

The architecture of an IEEE-802.16-based M2M-type communications system also allows for an IEEE-802.16-type M2M-type device 402 to act as an aggregation point for both IEEE-802.16-type M2M-type devices 402 and non IEEE-802.16-type M2M-type devices 407. The non IEEE-802.16-type M2M-type devices 407 use a different radio interface, such as an interface based on the IEEE-802.11 standard, the IEEE-802.15 standard, etc. Additionally, a peer-to-peer (P2P) connectivity between IEEE-802.16-type M2M-type devices 402 and non IEEE-802.16-type M2M-type devices 407 may also be supported (as depicted by dashed lines) in which the P2P connectivity may occur over an IEEE-802.16-based radio interface or over an alternate radio interface, such as an IEEE-802.11-based radio interface, an IEEE-802.15-based radio interface, etc. According to the subject matter disclosed herein, an M2M-type device 402 that acts as an aggregation point is responsive to an MTC Group ID configured as any of the exemplary embodiments disclosed herein.

Figure 5:
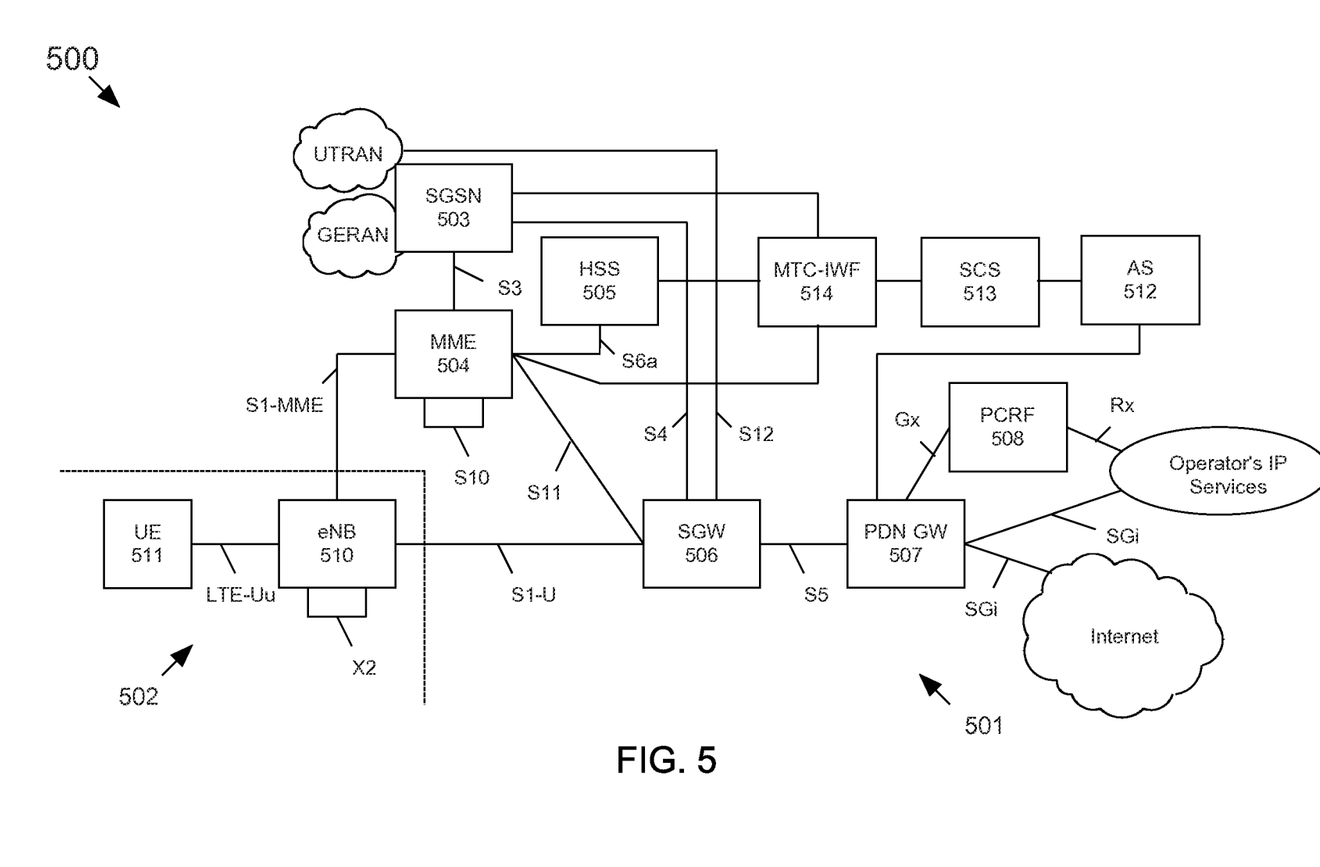
FIG. 5 shows an exemplary block diagram of the overall architecture of a 3GPP LTE network that includes one or more devices that are capable of utilizing an MTC Group ID according to the subject matter disclosed herein.

FIG. 5 shows an exemplary block diagram of the overall architecture of a 3GPP LTE network 500 that includes one or more devices that are capable of utilizing an MTC Group ID according to the subject matter disclosed herein. FIG. 5 also generally shows exemplary network elements and exemplary standardized interfaces. At a high level, network 500 comprises a core network (CN) 501 (also referred to as an evolved Packet System (EPC)), and an air-interface access network E-UTRAN 502. CN 501 is responsible for the overall control of the various User Equipment (UE) connected to the network and establishment of the bearers. CN 501 may include functional entities, such as a home agent HA and/or an ANDSF server or entity, although not explicitly depicted. E-UTRAN 502 is responsible for all radio-related functions.

The main exemplary logical nodes of CN 501 include, but are not limited to, a Serving GPRS Support Node 503, the Mobility Management Entity 504, a Home Subscriber Server (HSS) 505, a Serving Gate (SGW) 506, a PDN Gateway 507 and a Policy and Charging Rules Function (PCRF) Manager 508. The functionality of each of the network elements of CN 501 is well known and is not described herein. Each of the network elements of CN 501 are interconnected by well-known exemplary standardized interfaces, some of which are indicated in FIG. 5, such as interfaces S3, S4, S5, etc., although not described herein.

While CN 501 includes many logical nodes, the E-UTRAN access network 502 is formed by one node, the evolved NodeB (base station (BS), eNB or eNodeB) 510, which connects to one or more User Equipment (UE) 511, of which only one is depicted in FIG. 5. UE 511 is also referred to herein as a wireless device (WD) and/or a subscriber station (SS), and can include an M2M-type device. In one exemplary embodiment, UE 511 is capable of utilizing an MTC Group ID according to the subject matter disclosed herein. That is, UE 511 is capable of being addressed as part of an MTC Feature group. In one exemplary embodiment, eNB 510 transmits an MTC Group ID that in part of an IMSI and/or as part of a separate MTC Group ID message in order to address UE 511.

In one exemplary configuration, a single cell of an E-UTRAN access network 502 provides one substantially localized geographical transmission point (having multiple antenna devices) that provides access to one or more UEs. In another exemplary configuration, a single cell of an E-UTRAN access network 502 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 504 by an S1-MME interface and to SGW 506 by an S1-U interface. The protocols that run between the eNBs and the UEs are generally referred to as the "AS protocols." Details of the various interfaces are well known and not described herein.

The eNB 510 hosts the PHYsical (PHY), Medium Access Control (MAC), Radio Link Control (RLC), and Packet Data Control Protocol (PDCP) layers, which are not shown in FIG. 5, and which include the functionality of user-plane header-compression and encryption. The eNB 510 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 510 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 511, generates pages for UEs 511 over the air, broadcasts system information, controls UE measurement reporting, such as the periodicity of Channel Quality Information (CQI) reports, and allocates cell-level temporary identifiers to active UEs 511. The RRC layer also executes transfer of UE context from a source eNB to a target eNB during handover, and provides integrity protection for RRC messages. Additionally, the RRC layer is responsible for the setting up and maintenance of radio bearers.

End-to-end communications between an MTC application in a UE 511 and an MTC application in the external network uses services provided by the 3GPP system and optionally services provided by a Services Capability Server (SCS) 513. An SCS is an entity that connects to the 3GPP network to communicate with UEs used for MTC and an MTC-IWF in the Home Public Land Mobile Network (HPLMN). The SCS offers capabilities for use by one or multiple MTC applications that can be hosted by a UE 511. One or more corresponding MTC applications can be hosted by one or more Application Servers (AS) 512. The Application Servers 512 make use of SCS 513 for additional value-added services, which may be provided by a third-party service provider. The 3GPP system provides transport and communication services including various architectural enhancements motivated by, but not restricted to, MTC, such as control-plane device triggering.

MTC traffic between an MTC application hosted on a UE 511 and an MTC application hosted on an AS 512 can be direct, indirect or a hybrid of direct and indirect traffic. For direct traffic, AS 512 connects directly to an operator network in order to perform direct user-plane communications with UE 512 without the use of an SCS 513. For indirect traffic, AS 512 connects indirectly to the operator network through the services of SCS 513 in order to perform indirect user-plane communications with UE 511 and to utilize additional value-added services, such as control-plane device triggering. In one exemplary embodiment, SCS 513 is MTC service-provider controlled in that SCS 513 comprises an entity outside of the operator domain and the interface to the operator domain is an external interface. In an alternative exemplary embodiment, SCS 513 is a 3GPP-network operator-controlled SCS. That is, SCS 513 comprises an entity within the operator domain and the interface is an internal interface to the Public Land Mobile Network (PLMN). For hybrid traffic, AS 512 uses both direct and indirect traffic simultaneously in order to connect directly to the operator's network to perform direct user-plane communications with UE 511 while also using SCS 513. From a 3GPP-network perspective, the direct user-plane communication from AS 512 and any value added control-plane related communications from SCS 513 are independent and have no correlation to each other even though they may be servicing the same MTC Application hosted by AS 512. Because the different traffic types are not mutually exclusive, and may be comp complementary, it is possible for a 3GPP operator to combine the different traffic types for different applications, which may include a combination of both MTC-service-provider and 3GPP-network-operator-controlled SCSs communicating with the same PLMN. In a scenario in which UE 511 is a roaming-type device, a Machine-type communication-Interworking Function (MTC-IWF) 514 connects with HSS 505 and a Short Message Service-Service Center (SMS-SC) (not shown) within the operator network and with the serving SGSN 503, MME 504 and the MSC in a visited network.

Figure 6:
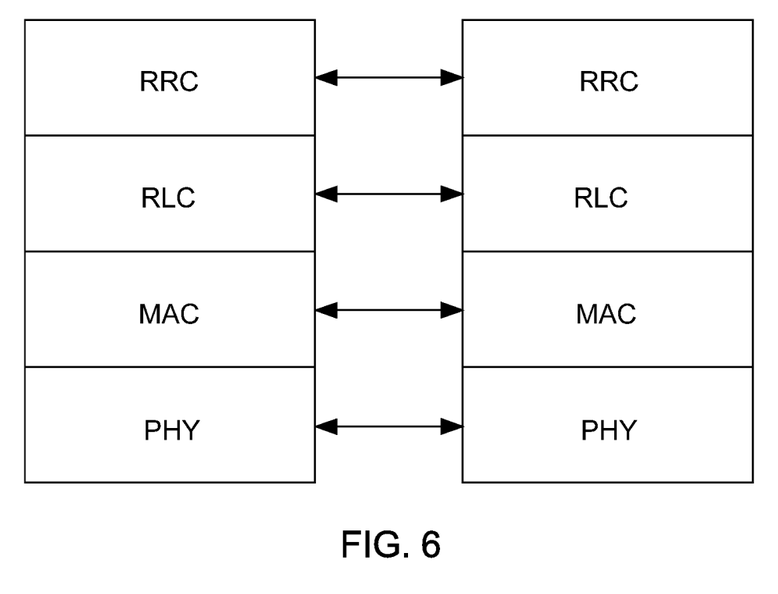
FIGS. 6 and 7 respectively depict exemplary radio interface protocol structures between a UE and an eNodeB that are based on a 3GPP-type radio access network standard and that is capable of utilizing an MTC Group ID according to the subject matter disclosed herein.
Figure 7:
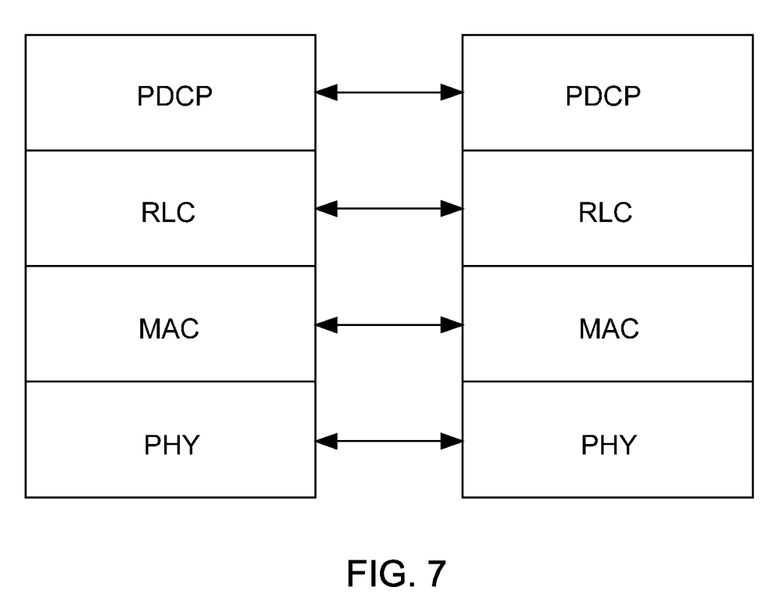

FIGS. 6 and 7 respectively depict exemplary radio interface protocol structures between a UE and an eNodeB that are based on a 3GPP-type radio access network standard and that is capable of utilizing an MTC Group ID according to the subject matter disclosed herein. More specifically, FIG. 6 depicts individual layers of a radio protocol control plane and FIG. 7 depicts individual layers of a radio protocol user plane. The protocol layers of FIGS. 6 and 7 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 8:
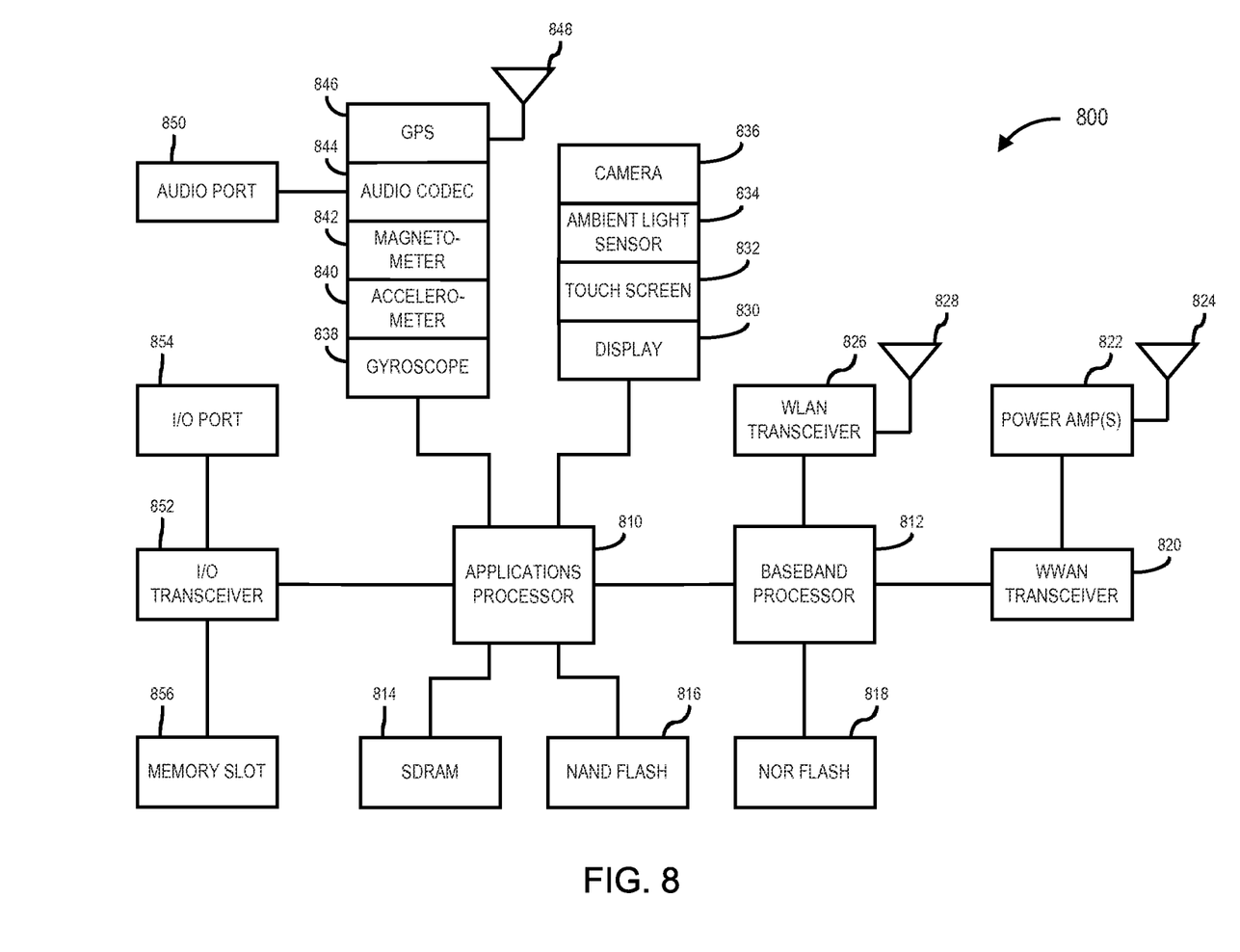
FIG. 8 depicts an exemplary functional block diagram of an information-handling system that is capable of utilizing an MTC Group ID according to the subject matter disclosed herein.

FIG. 8 depicts an exemplary functional block diagram of an information-handling system 800 that is capable of utilizing an MTC Group ID according to the subject matter disclosed herein. Information-handling system 800 of FIG. 8 may tangibly embody one or more of any of the exemplary devices, exemplary network elements and/or functional entities of the network as shown in and described with respect to FIG. 1, FIG. 4, and/or core network 501 as shown in and described with respect to FIG. 5. In one exemplary embodiment, information-handling system 700 may represent the components of MTC-type device 100, M2M-type device 402, eNB 510, and/or UE 511, with greater or fewer components depending on the hardware specifications of the particular device or network element. In another exemplary embodiment, information-handling system 800 may provide M2M-type device capability. In yet another exemplary embodiment, information-handling system 800 is capable of utilizing an MTC Group ID according to the subject matter disclosed herein. Although information-handling system 800 represents one example of several types of computing platforms, information-handling system 800 may include more or fewer elements and/or different arrangements of elements than shown in FIG. 8, and the scope of the claimed subject matter is not limited in these respects.

In one or more embodiments, information-handling system 800 may comprise one or more applications processor 810 and a baseband processor 812. Applications processor 810 may be utilized as a general purpose processor to run applications and the various subsystems for information handling system 800, and is capable of utilizing an MTC Group ID according to the subject matter disclosed herein in connection with one or more MTC Features. Applications processor 810 may include a single core or alternatively may include multiple processing cores wherein one or more of the cores may comprise a digital signal processor or digital signal processing core. Furthermore, applications processor 810 may include a graphics processor or coprocessor disposed on the same chip, or alternatively a graphics processor coupled to applications processor 810 may comprise a separate, discrete graphics chip. Applications processor 810 may include onboard memory, such as cache memory, and further may be coupled to external memory devices such as synchronous dynamic random access memory (SDRAM) 814 for storing and/or executing applications during operation, such as utilizing an MTC Group ID according to the subject matter disclosed herein. NAND flash 816 for storing applications and/or data even when information handling system 800 is powered off. Further, applications processor 810 may execute computer-readable instructions stored in SDRAM 814 and/or NAND flash 816 that provide a capability of utilizing an MTC Group ID according to the subject matter disclosed herein in connection with one or more MTC Features.

In one exemplary embodiment, baseband processor 812 may control the broadband radio functions for information-handling system 800. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example, for communicating via a 3GPP LTE network or the like as discussed herein with respect to FIG. 8. In one exemplary embodiment, baseband processor 812 may control broadband radio functions to receive an MTC Group ID that in part of an IMSI and/or as part of a separate MTC Group ID message in order to information-handling system 800. Applications processor 810, for example, would process the received MTC Group ID and determine whether the received MTC Group ID corresponds to the Group ID to which information-handling system 800 belongs.

WWAN transceiver 820 couples to one or more power amplifiers 822 that are respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and that may be capable of communicating via a Bluetooth-based standard, an IEEE 802.11-based standard, an IEEE 802.16-based standard, an IEEE 802.18-based wireless network standard, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 810 and baseband processor 812, and the scope of the claimed subject matter is not limited in these respects. For example, any one or more of SDRAM 814, NAND flash 816 and/or NOR flash 818 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 810 may drive a display 830 for displaying various information or data, and may further receive touch input from a user via a touch screen 832, for example, via a finger or a stylus. In one exemplary embodiment, screen 832 displays a menu and/or options to a user that are selectable via a finger and/or a stylus for entering information into information-handling system 800. In yet another exemplary embodiment, screen 832 display a menu and/or options to a user in response to receiving an MTC Group ID that in part of an IMSI and/or as part of a separate MTC Group ID message that corresponds to one or more Group IDs to which information-handling system 800 belongs. The displayed menu and/or options would be selectable by a user via a finger and/or a stylus.

An ambient light sensor 834 may be utilized to detect an amount of ambient light in which information-handling system 800 is operating, for example, to control a brightness or contrast value for display 830 as a function of the intensity of ambient light detected by ambient light sensor 834. One or more cameras 836 may be utilized to capture images that are processed by applications processor 810 and/or at least temporarily stored in NAND flash 816. Furthermore, applications processor may be coupled to a gyroscope 838, accelerometer 840, magnetometer 842, audio coder/decoder (CODEC) 844, and/or global positioning system (GPS) controller 846 coupled to an appropriate GPS antenna 848, for detection of various environmental properties including location, movement, and/or orientation of information handling system 800. Alternatively, controller 846 may comprise a Global Navigation Satellite System (GNSS) controller. Audio CODEC 844 may be coupled to one or more audio ports 850 to provide microphone input and speaker outputs either via internal devices and/or via external devices coupled to information-handling system via the audio ports 850, for example, via a headphone and microphone jack. In addition, applications processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory, such as secure digital (SD) card or a subscriber identity module (SIM) card, although the scope of the claimed subject matter is not limited in these respects.

Figure 9:
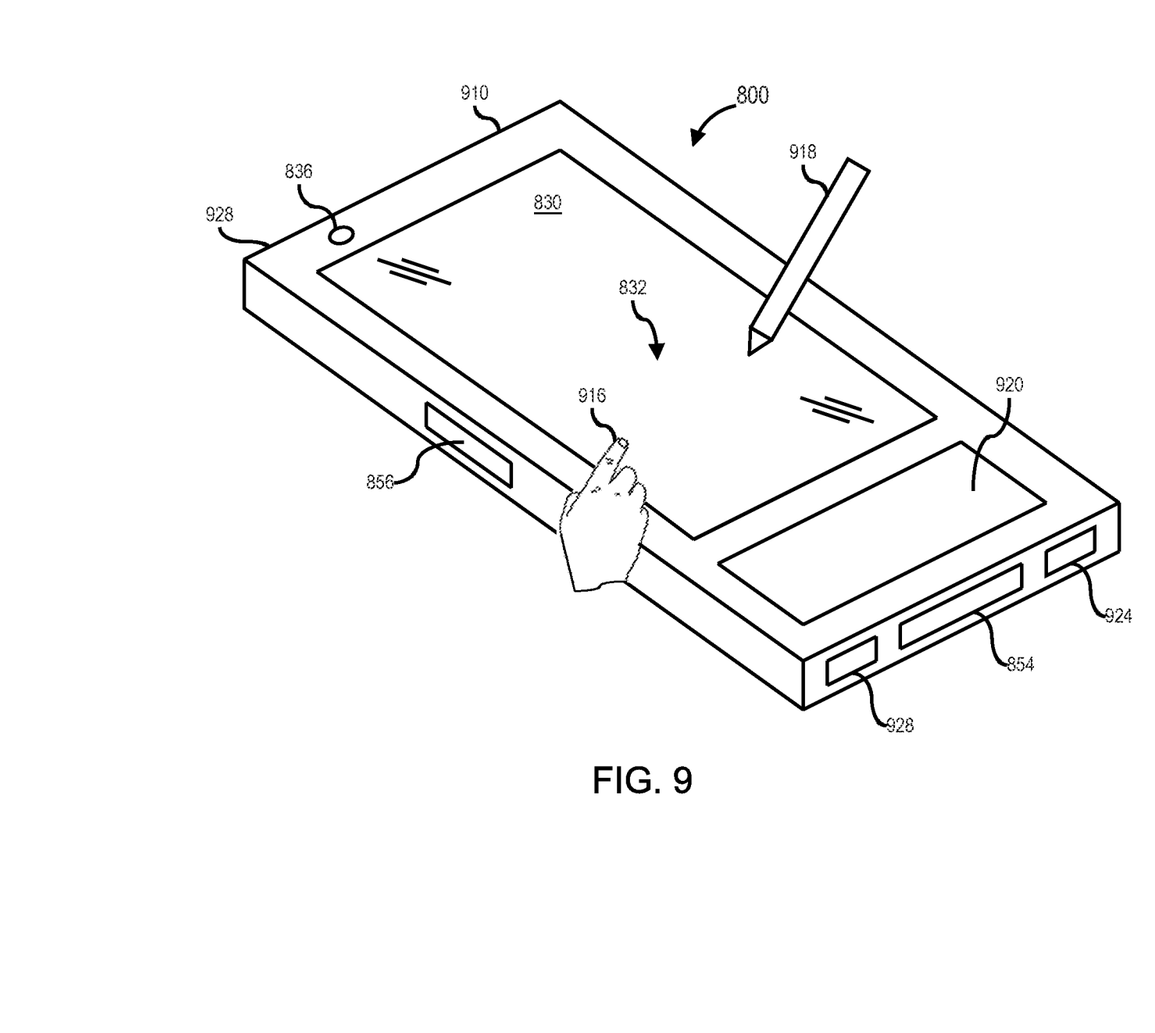
FIG. 9 depicts an isometric view of an exemplary embodiment of the information-handling system of FIG. 8 that optionally may include a touch screen in accordance with one or more embodiments disclosed herein.

FIG. 9 depicts an isometric view of an exemplary embodiment of the information-handling system of FIG. 8 that optionally may include a touch screen in accordance with one or more embodiments disclosed herein. FIG. 9 shows an example implementation of information-handling system 800 of FIG. 8 tangibly embodied as a cellular telephone, smartphone, smart-type device, or tablet-type device or the like, that is capable of utilizing an MTC Group ID according to the subject matter disclosed herein. In one or more embodiments, the information-handling system 800 may comprise any one of the infrastructure nodes, MTC-type device 100, M2M-type device 402 of FIG. 4 mobile station UE 511 of FIG. 5, and/or an M2M-type device, although the scope of the claimed subject matter is not limited in this respect. The information-handling system 800 may comprise a housing 910 having a display 830 that may include a touch screen 832 for receiving tactile input control and commands via a finger 916 of a user and/or a via stylus 918 to control one or more applications processors 810. The housing 910 may house one or more components of information-handling system 800, for example, one or more applications processors 810, one or more of SDRAM 814, NAND flash 816, NOR flash 818, baseband processor 812, and/or WWAN transceiver 820. The information-handling system 800 further may optionally include a physical actuator area 920 which may comprise a keyboard or buttons for controlling information-handling system via one or more buttons or switches. The information-handling system 800 may also include a memory port or slot 856 for receiving non-volatile memory, such as flash memory, for example, in the form of a secure digital (SD) card or a subscriber identity module (SIM) card. Optionally, the information-handling system 800 may further include one or more speakers and/or microphones 924 and a connection port 854 for connecting the information-handling system 800 to another electronic device, dock, display, battery charger, and so on. Additionally, information-handling system 800 may include a headphone or speaker jack 928 and one or more cameras 836 on one or more sides of the housing 910. It should be noted that the information-handling system 800 of FIGS. 8 and 9 may include more or fewer elements than shown, in various arrangements, and the scope of the claimed subject matter is not limited in this respect.

Figure 10:
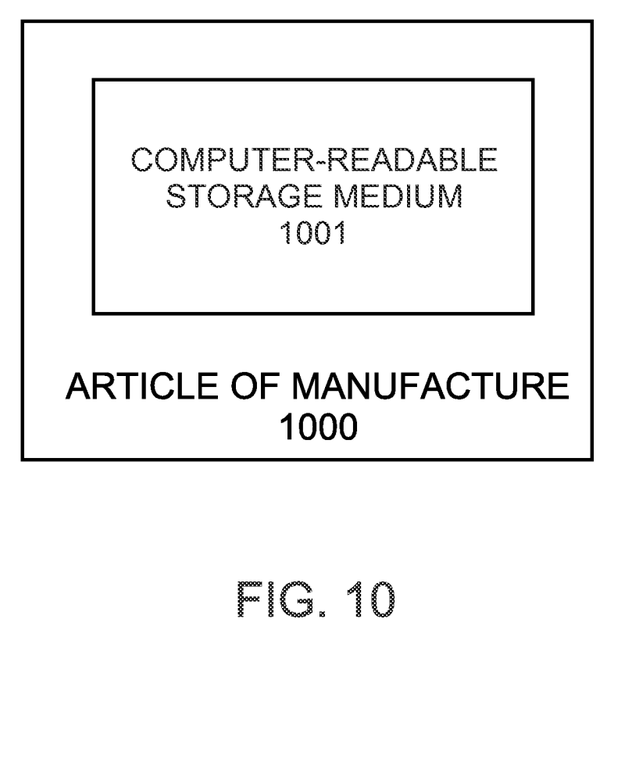
FIG. 10 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 10 depicts an exemplary embodiment of an article of manufacture 1000 comprising a non-transitory computer-readable storage medium 1001 having stored thereon computer-readable instructions that, when executed by a computer-type device, results in any of the various techniques and methods according to the subject matter disclosed herein. Exemplary computer-readable storage mediums that could be used for computer-readable storage medium 1001 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. A wireless device, comprising:
   a receiver capable of receiving a signal from at least one node of a wireless network, the signal containing a machine-type communication (MTC) comprising MTC Group ID information, the MTC Group ID information corresponding to an MTC Feature that provides at least one system optimization for the wireless device; and
   a processor coupled to the receiver and capable of determining whether the MTC Group ID contained in the received signal corresponds to an MTC Feature to which the wireless device is a member;
   wherein the MTC Group ID information contained in the received signal comprises part of a Mobile Subscription Identification (MSIN) field of an International Mobile Subscriber Identify (IMSI).

2. The wireless device according to claim 1, further comprising a memory storing MTC Group ID information corresponding to at least one MTC Feature to which the wireless is a member, and
   wherein the processor is capable of determining whether the MTC Group ID information contained in the received signal corresponds to the MTC Group ID information stored in the memory.

3. The wireless device according to claim 1, wherein a total number of digits contained in the IMSI containing the MTC Group ID information is 15 or fewer digits.

4. The wireless device according to claim 1, wherein the MTC Group ID information contained in the received signal comprises additional digits added to an International Mobile Subscriber Identify (IMSI).

5. The wireless device according to claim 4, wherein a total number of digits contained in the IMSI containing the MTC Group ID information is 20 or fewer digits.

6. The wireless device according to claim 1, wherein the MTC Group ID information contained in the received signal comprises part of a separate MTC Group message.

7. The wireless device according to claim 1, wherein the MTC Group ID is arranged to be part of a Network Access Identifier (NAI), a Session Initiation Protocol Uniform Resource Identifier (SIP URI), or a Fully Qualified Domain Name (FQDN).

8. The wireless device according to claim 1, further comprising a touchscreen display capable of receiving input information from a touch of a user or a stylus.

9. The wireless device according to claim 1, wherein the wireless device comprises a cellular telephone, smartphone, smart-type device, or tablet-type device.

10. The wireless device according to claim 1, wherein the wireless network comprises a network based on a Bluetooth-based standard, an IEEE 802.11-based standard, an IEEE 802.16-based standard, an IEEE 802.18-based wireless network standard, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, or a ZigBee-based network, or a combination thereof.

11. A method, comprising:
    receiving a signal from at least one node of a wireless network, the signal containing a machine-type communication (MTC) comprising MTC Group ID information, the MTC Group ID information corresponding to an MTC Feature that provides at least one system optimization for the wireless device; and
    determining whether the MTC Group ID contained in the received signal corresponds to an MTC Feature to which the wireless device is a member; and
    if the MTC Group ID contained in the received signal corresponds to an MTC Features to which the wireless device is a member, responding to additional information contained in the received signal relating to the MTC Feature to which the wireless device is a member,
    otherwise, ignoring the received signal;
    wherein the MTC Group ID information contained in the received signal comprises part of a Mobile Subscription Identification (MSIN) field of an International Mobile Subscriber Identify (IMSI).

12. The method according to claim 11, wherein a total number of digits contained in the IMSI containing the MTC Group ID information is 15 or fewer digits.

13. The method according to claim 11, wherein the MTC Group ID information contained in the received signal comprises additional digits added to an International Mobile Subscriber Identify (IMSI).

14. The method according to claim 13, wherein a total number of digits contained in the IMSI containing the MTC Group ID information is 20 or fewer digits.

15. The method according to claim 11, wherein the MTC Group ID information contained in the received signal comprises part of a separate MTC Group message.

16. The method according to claim 11, wherein the MTC Group ID information is arranged to be part of a Network Access Identifier (NAI), a Session Initiation Protocol Uniform Resource Identifier (SIP URI), or a Fully Qualified Domain Name (FQDN).

17. The method according to claim 11, further comprising receiving input information through a touchscreen display from a touch of a user or a stylus.

18. The method according to claim 11, wherein the received signal is received by a wireless device comprises a cellular telephone, smartphone, smart-type device, or tablet-type device.

19. The method according to claim 11, wherein the wireless network comprises a network based on a Bluetooth-based standard, an IEEE 802.11-based standard, an IEEE 802.16-based standard, an IEEE 802.18-based wireless network standard, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, or a ZigBee-based network, or a combination thereof.

20. A wireless device, comprising:
    a receiver capable of receiving a signal from at least one node of a wireless network, the signal containing a machine-type communication (MTC) comprising MTC Group ID information, the MTC Group ID information contained in the received signal corresponding to an MTC Feature that provides at least one system optimization for the wireless device, and comprising a part of a Mobile Subscription Identification (MSIN) field of an International Mobile Subscriber Identify (IMSI) additional digits added to an IMSI, or a part of a separate MTC Group message; and a processor coupled to the receiver and capable of determining whether the MTC Group ID contained in the received signal corresponds to an MTC Feature to which the wireless device is a member; and a memory storing MTC Group ID information corresponding to at least one MTC Feature to which the wireless is a member, the processor being capable of determining whether the MTC Group ID information contained in the received signal corresponds to the MTC Group ID information stored in the memory.

21. The wireless device according to claim 20, wherein a total number of digits contained in the IMSI containing the MTC Group ID information is 15 or fewer digits.

22. The wireless device according to claim 20, wherein a total number of digits contained in the IMSI containing the MTC Group ID information is 20 or fewer digits.

23. The wireless device according to claim 20, wherein the MTC Group ID information is arranged to be part of a Network Access Identifier (NAI), a Session Initiation Protocol Uniform Resource Identifier (SIP URI), or a Fully Qualified Domain Name (FQDN).

24. The wireless device according to claim 20, further comprising a touchscreen display capable of receiving input information from a touch of a user or a stylus.

25. The wireless device according to claim 20, wherein the wireless device comprises a cellular telephone, smartphone, smart-type device, or tablet-type device.

26. The wireless device according to claim 20, wherein the wireless network comprises a network based on a Bluetooth-based standard, an IEEE 802.11-based standard, an IEEE 802.16-based standard, an IEEE 802.18-based wireless network standard, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, or a ZigBee-based network, or a combination thereof.

27. An article comprising: a non-transitory computer-readable medium having stored thereon instructions that, if executed, result in at least the following:

receiving a signal from at least one node of a wireless network, the signal containing a machine-type communication (MTC) comprising MTC Group ID information, the MTC Group ID information corresponding to an MTC Feature that provides at least one system optimization for the wireless device, the MTC Group ID information contained in the received signal comprising part of a Mobile Subscription Identification (MSIN) field of an International Mobile Subscriber Identify (IMSI), additional digits added to an International Mobile Subscriber Identify (IMSI), or part of a separate MTC Group message, and the wireless network comprising a network based on a Bluetooth-based standard, an IEEE 802.11-based standard, an IEEE 802.16-based standard, an IEEE 802.18-based wireless network standard, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, or a ZigBee-based network, or a combination thereof; and determining whether the MTC Group ID contained in the received signal corresponds to an MTC Feature to which the wireless device is a member; and if the MTC Group ID contained in the received signal corresponds to an MTC Features to which the wireless device is a member, responding to additional information contained in the received signal relating to the MTC Feature to which the wireless device is a member, otherwise, ignoring the received signal.

28. The article according to claim 27, further comprising receiving input information through a touchscreen display from a touch of a user or a stylus.

* * * * *